No. 710,936. Patented Oct. 14, 1902.
E. C. BACON.
ROLLER SUPPORT FOR CONVEYER BELTS.
(Application filed Feb. 26, 1902.)

(No Model.)

Witnesses:
Stephen L. Morgan
M. E. Grace

Inventor:
Earle C. Bacon,
by his attorney,
Charles R. Searle.

UNITED STATES PATENT OFFICE.

EARLE C. BACON, OF NEW YORK, N. Y.

ROLLER-SUPPORT FOR CONVEYER-BELTS.

SPECIFICATION forming part of Letters Patent No. 710,936, dated October 14, 1902.

Application filed February 26, 1902. Serial No. 95,767. (No model.)

*To all whom it may concern:*

Be it known that I, EARLE C. BACON, a citizen of the United States, residing in the city of New York, borough of Brooklyn, in the county of Kings and State of New York, have invented a certain new and useful Improvement in Roller-Supports for Conveyer-Belts, of which the following is a specification.

The invention relates to the rollers or idler-pulleys on which a conveyer-belt and its load are supported in their travel.

The object of the invention is to provide a support which shall be simple in construction, easily and cheaply manufactured and installed, and in which the wear both of support and belt shall be lessened. I attain these objects by employing for each support a shaft mounted with freedom to revolve in bearings and carrying a loose central pulley or roller between two conical outer pulleys or rollers fixed on the shaft. The belt assumes a curve in cross-section, as usual, and contacts at its outer elevated margins with the conical pulleys at certain points on their peripheries and revolves them and the shaft at a corresponding rate of speed, while the central loosely-mounted roller is revolved independently of the shaft and pulleys at a slower rate induced by the contact of the lower portion of the curve along or near the central line of the belt. Thus constructed the outer and central portions of the belt are supported on the pulleys and roller free to revolve in unison with the rate of speed induced by the travel of those portions and avoid wearing-friction between the surfaces, and as the conical pulleys are fast on the shaft the strains occasioned by the tendency of the loaded belt to force them apart are received and equalized in the shaft and are not transferred to the bearings. Consequently the friction and wear due to end thrust of the pulleys against the bearings are avoided.

The invention also consists in certain details of construction and arrangement of parts to be hereinafter described.

The accompanying drawings form a part of this specification and show a preferred form of the invention.

Figure 1:
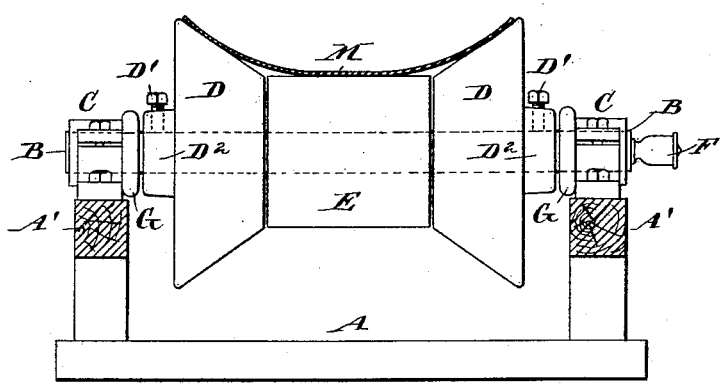
Figure 2:
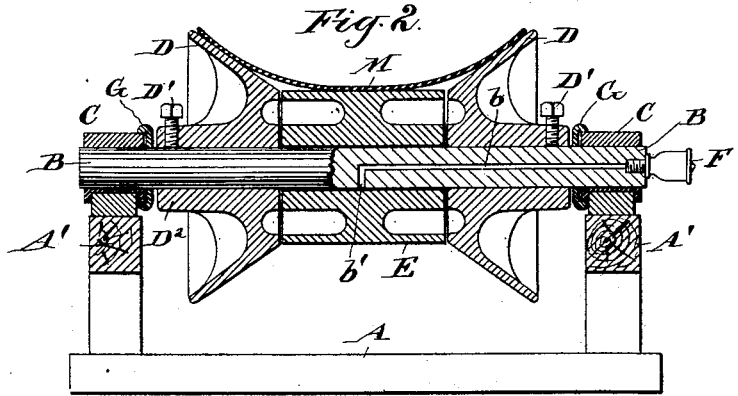
Figure 3:
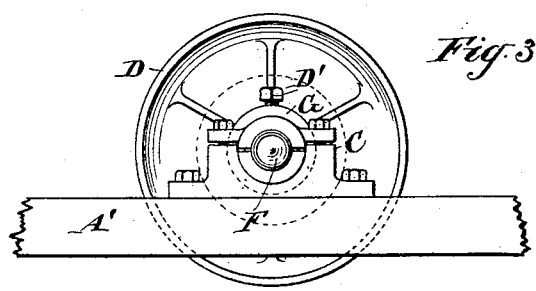

Figure 1 is an elevation of one of my improved supports seen in the direction of the line of travel of the conveyer-belt. Fig. 2 is a corresponding vertical section, and Fig. 3 is a corresponding elevation at a right angle to Fig. 1.

Similar letters of reference indicate the same parts in all the figures.

A' A' are the stringers or beams laid parallel with each other at the proper distance apart, forming part of the fixed framing A of the conveyer apparatus and supporting the sets of rollers placed at suitable intervals, as usual. A description and illustration of a single set will suffice for all.

B is a shaft mounted with freedom to revolve in bearings C C, fixed upon the stringers A' A' and carrying at each end between the bearings a pulley or roller D in the form of a truncated cone with its base toward the adjacent bearing. The conical rollers or pulleys D D are fast on the shaft, being secured thereto by set-screws D' D', as shown, or keyed or otherwise firmly attached to the shaft, so as to revolve therewith. Between the pulleys D D is a cylindrical roller E, mounted loosely on the shaft and free to revolve independently thereof.

M is the conveyer-belt, supported on the pulleys and rollers, the return portion and its supporting means being omitted.

The shaft B is drilled axially, as at $b$, to about the mid-length, at which point the channel $b$ is met by a radially-drilled hole $b'$. The outer end of the channel is counterbored to receive the oil or grease cup F, from which lubricant is delivered to the roller E, as will be understood.

The self-contained construction attained by securing the pulleys D D to the shaft avoids end thrust of the pulleys D D in either direction and reduces the wear between the surfaces of the hubs $D^2$ $D^2$ and the adjacent faces of the bearings. To exclude dust and grit from these bearings, I apply dust-collars G G, of any approved type, between the hubs and bearings, as shown, the employment of such dust-excluding devices being permitted by the absence of end movement of the pulleys tending to crowd against them. This important characteristic also permits the several sets of rollers to aline themselves automatically to the belt by providing room for a limited amount of axial play of each shaft in its bearings, if desired.

Modifications may be made in the forms and proportions of the several parts without departing from the invention. As before stated, the means for securing the pulleys D to the shaft may be varied, it being essential only that they be firmly attached. The pulleys and roller may be concaved, if preferred, or otherwise shaped to conform to the contour of the belt, and any approved form of the latter may be employed. Any preferred form of bearings may be used, and the dust-rings may be varied or omitted.

I claim—

1. In a device of the character set forth, the combination of a shaft supported in fixed bearings, a roller loosely mounted on said shaft with freedom to revolve independently thereof, a pair of conical pulleys fast on said shaft and inclosing said roller between them, all arranged to serve with a conveyer-belt, whereby the latter is supported and strains tending to separate said pulleys are resisted and equalized in said shaft.

2. The combination of the shaft B, and bearings C C therefor, the conical pulleys D D fast on said shaft, the roller E loosely mounted on said shaft between said pulleys, and the dust-collars G G between said pulleys and bearings, all arranged to serve with a conveyer-belt.

3. The combination of the shaft B and bearings C C therefor, the conical pulleys D D fast on said shaft, the roller E loosely mounted on said shaft between said pulleys, the oil-cup F and channels $b$ $b'$ therefrom in said shaft to said roller, all arranged to serve with a conveyer-belt.

4. The combination of the stringers A' A', bearings C C thereon, shaft B supported in said bearings, conical pulleys D D secured to said shaft adjacent to said bearings, the roller E mounted on said shaft and free to revolve independently thereof and between said pulleys, and a conveyer-belt supported by said pulleys and roller.

In testimony that I claim the invention above set forth I affix my signature in presence of two witnesses.

EARLE C. BACON.

Witnesses:
W. L. MURRAY,
CHARLES R. SEARLE.